United States Patent [19]

Wada

[11] Patent Number: 4,642,697

[45] Date of Patent: Feb. 10, 1987

[54] FACSIMILE RELAY DEVICE

[75] Inventor: Yoshinori Wada, Miura, Japan

[73] Assignee: Ricoh Company, Ltd., Japan

[21] Appl. No.: 681,508

[22] Filed: Dec. 14, 1984

[30] Foreign Application Priority Data

Dec. 14, 1983 [JP] Japan ................................ 58-234297

[51] Int. Cl.[4] .............................................. H06N 1/32
[52] U.S. Cl. .................................... 358/257; 358/256; 358/286; 379/100
[58] Field of Search ....................... 358/256, 257, 286; 179/2 R, 90 B

[56] References Cited

U.S. PATENT DOCUMENTS

| 3,824,334 | 7/1974 | Jacobson et al. | 358/257 |
| 4,113,991 | 9/1978 | Gorham et al. | 358/257 |
| 4,419,697 | 12/1983 | Wada | 358/257 |
| 4,494,149 | 1/1985 | Furukawa | 358/257 |
| 4,522,379 | 7/1985 | Tsukioka | 358/257 |
| 4,586,086 | 4/1986 | Ohzeki | 358/256 |

Primary Examiner—James J. Groody
Assistant Examiner—John K. Peng
Attorney, Agent, or Firm—Guy W. Shoup

[57] ABSTRACT

A facsimile relay device includes a battery backed-up memory for storing an image information sent from a sending station and information concerning the latter station and a control means for sending to the sending station a relay certificate notifying of a completion of a relay of the image information to a destination station. The control means operates to repeat the sending of the relay certificate when the sending is unsuccessful and to print it out after a predetermined number of repetitive sendings of the certificate.

4 Claims, 5 Drawing Figures

FACSIMILE RELAY DEVICE

BACKGROUND OF THE INVENTION

The present invention relates to a facsimile relay device.

A facsimile device having an image memory is known and practically used. Such device having various functions which are applications of the image storage function of the image memory is also known.

A facsimile relay device is one of such devices for performing such functions.

The facsimile relay device functions to store, in the image memory, an image information and a destination information including a destination appointing information (for example, telephone number of the destination station, etc.) and a sending appointment time and to call for the destination station at the appointed time and send the stored image information to the destination station. It may be possible to designate a plurality of stations to which such stored image information is to be sent.

The facsimile relay device further sends a relay certificate to the sending station which had requested the relay after the relay transmission is completed so that the sending station can confirm the completion of a relayed transmission.

In the conventional relay device, however, it is impossible to send such certificate to the sending station when the latter station is busy or a communication line between the latter station and the relay device malfunctions.

Further, the conventional relay device is generally provided no protection facility for erasure of the content of the image memory due to an accidental brief interruption of power supply to the relay device and, therefore, it is impossible to know, from the side of the sending station, whether or not the image information has been relayed to a desired station.

SUMMARY OF THE INVENTION

An object of the present invention is to provide a facsimile relay device which has a protection facility against erasure of information sent from a relay requesting station thereto due to a power supply failure and which is capable of sending a relay certificate to the relay requesting station a limited number of times repeatingly so that, when it is unsuccessful in sending it within the limited number of sending trials, a printer of the facsimile relay device prints out the relay certificate which a facsimile operator can send to the relay requesting station reliably.

DETAILED DESCRIPTION OF THE PREFERRED EMBODIMENTS

Figure 1:
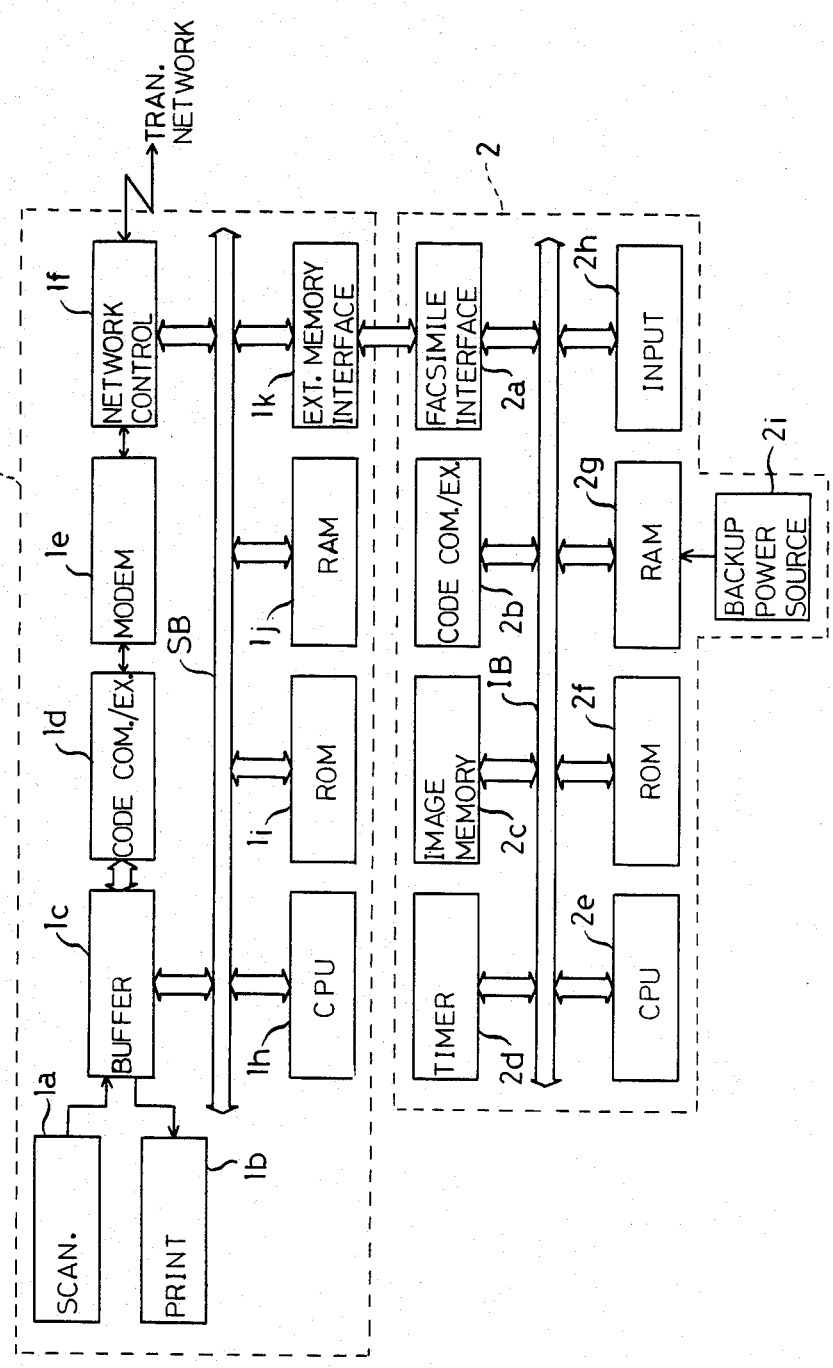
FIG. 1 is a blockdiagram of a preferred embodiment of the present invention.

FIG. 1 shows a block diagram of a preferred embodiment of a facsimile relay device according to the present invention. In this invention, an auxiliary memory 2 is added to a conventional facsimile device 1 to provide the function of a relay thereto.

In FIG. 1, the facsimile relay device comprises a scanner $1a$ for optically scanning an original sheet bearing an image information to be sent to produce an electrical image signal for transmission, a printer $1b$ for printing a dot pattern and a buffer $1c$ for converting an output signal from the scanner $1a$ into an 8-bit parallel signal and an output of a code compression/expansion circuit $1d$ into a serial signal to be supplied to the printer $1b$. The code compression/expansion circuit $1d$ functions to code and compress data from the buffer $1c$ and to supply the coded and compressed data to a MODEM $1e$ and also functions to decode and expand received data from the MODEM $1e$ and supply the decoded and expanded data to the buffer $1c$. The buffer $1c$ also acts as a line memory.

The present device further comprises a network control circuit $1f$ for controlling a transmission network such as telephone line to establish or open the transmission line, a CPU $1h$ for controlling the scanner $1a$, the printer $1b$, the buffer $1c$, the code compresson/expansion circuit $1d$ the MODEM $1e$ and the network control circuit $1f$, an ROM $1i$ for storing a program to be performed by the CPU $1h$, an RAM $1j$ for providng a work area etc. for the CPU $1h$ and a external memory interface $1k$ interposed between the facsimile device 1 and the auxiliary memory 2.

The buffer $1c$, the network control circuit $1f$, the CPU $1h$, the ROM $1i$, the RAM $1j$ and the external interface $1k$ are connected to a system bus line SB.

The auxiliary memory 2 includes a facsimile interface $2a$ mutually connected to the external memory interface $1k$ for transmission of data between the facsimile device 1 and the auxiliary memory 2, a code compression/expansion circuit $2b$ for compressing the image data received from the facsimile interface $2a$ to minimize a capacity of an image memory $2c$ and to store it therein and decoding the date to restore the image data and a timer circuit $2d$. The auxiliary memory 2 further includes CPU $2e$ for controlling the facsimile interface $2a$, the code compression/expansion circuit $2b$, the image memory $2c$ and the timer circuit $2d$, an ROM $2f$ for storing a program to be performed by the CPU $2e$, an RAM $2g$ and an input portion $2h$ having numerical and alphabetic keys and function keys.

The RAM $2g$ provides a work area for the CPU $2e$ and stores various control table, which are to be described later, for controlling memory areas of the image memory $2c$ and various information for transmission, which are also described later.

The RAM is backed up by a back-up power source $2i$. The respective keys of the input portion $2h$ are arranged on an operation panel (not shown) of the memory 2.

The facsimile interface $2a$, the code compression/expansion circuit $2b$, the image memory $2c$, the timer $2d$, the CPU $2e$, the ROM $2f$, the RAM $2g$ and the input portion $2h$ are connected to an inner bus line IB.

Figure 2:
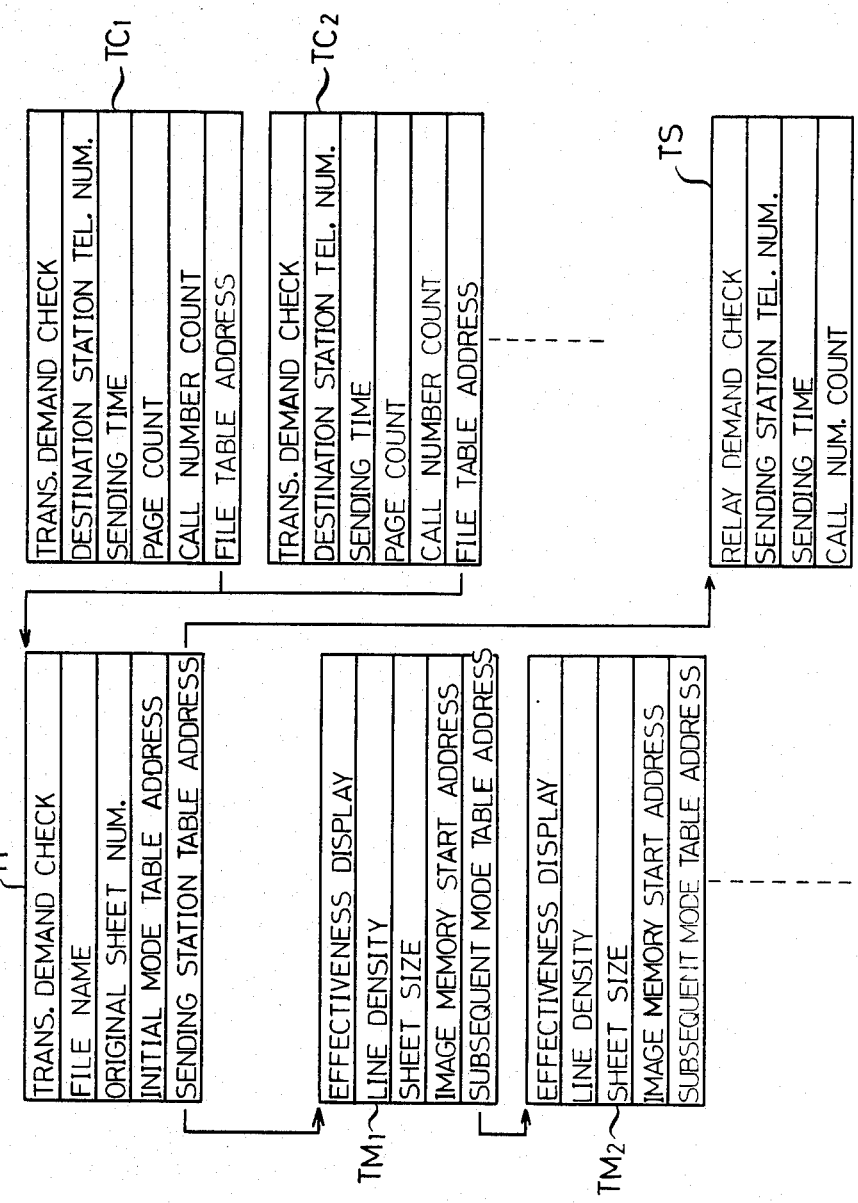
FIG. 2 illustrates various managing information formats.
Figure 3:
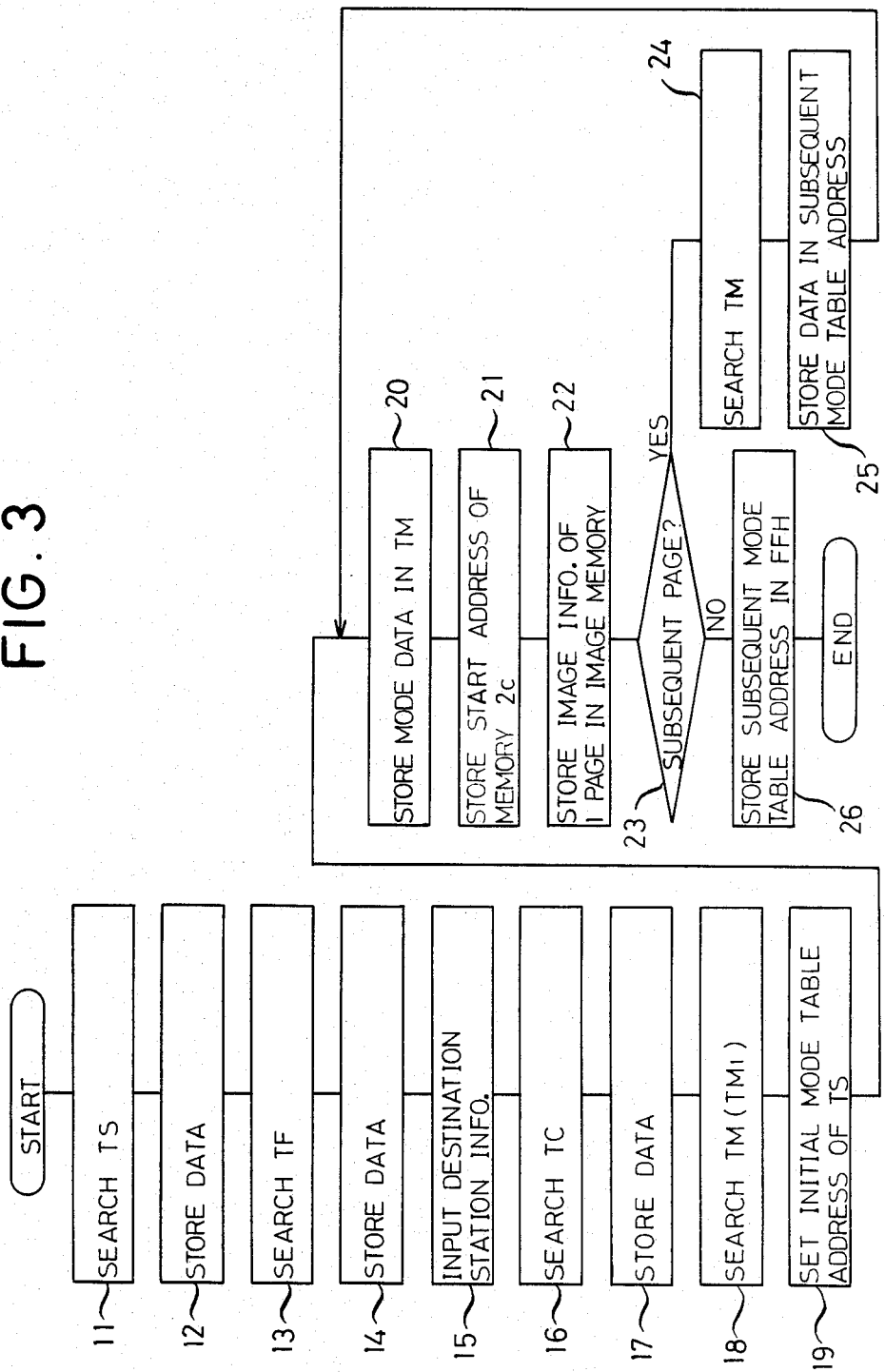
FIG. 3 is a flow chart of an operation of an image information storage device of the embodiment in FIG. 1.

FIG. 2 illustrates tables included in the RAM $2g$ and the various information which are provided in the tables and controlled by the CPU $2e$.

In FIG. 2, a file table TF for a control of an image information to be stored in the image memory 2c, mode tables TM 1, TM 2 . . . each for controlling the image information included in one page of the image memory 2c, destination tables TC 1, TC 2 . . . each for storing destination stations and sending times, etc., and a sending table TS for storing information concerning a relay requesting station.

The file table TF is composed of a tranmsission demand check information showing whether or not the table contains image information whose transmission is requested, a file name constituted with 4-digit number etc., an original information showing the number of image information pages to be managed by this table, an initial mode table address showing an address of the mode table TC 1 which manages the first page of the image information and a sending station address showing an address of the sending table TS corresponding to the relay requesting station for the image information to be managed by this table.

The image information is assigned to the file table TF.

Each of the mode tables TM 1, TM 2, . . . includes an effectiveness display information showing that the table is managing an effective image information, a line density information showing the line density of the image information, a sheet size information showing size of a sheet to be used, an image memory start address showing a start portion of a memory region of the memory 2c occupied by the image information managed by the table or an address of the mode table managing an image information of a subsequent page when a plurality of image information pages are included or a subsequent mode table address storing an end data FF (16 notation number) when there is no subsequent page.

The mode tables TM 1, TM 2 . . . correspond in number to original sheets constituting an image information and these tables are assigned to a single file table TF.

Each of the destination tables TC 1, TC 2 . . . includes a transmission demand check information for determining whether or not an image information is to be sent to a receiving or destination station managed by these tables and, if the determination is affirmative, whether or not the transmission has been performed properly, a destination station telephone number information, a sending time information for assigning a time at which the sending is to be performed, a page counter for storing the number of the original sheets transmitted, a call number counter for counting the number of calls and a file table address representing an address of the file table TF managing the image information to be sent.

The destination tables TC 1, TC 2, . . . correspond in number to the destination stations to which the image information is to be relayed and are assigned to a single file table TF.

The sending station table TS includes a relay demand check information as to a demand of relay of a sending station included in the table, a sending station telephone number information, a sending time for managing a subsequent call time for a relay certificate transmission, and a call number counter storing the number of calls.

Each sending station table TS is assigned to one of the file table TF.

In operation, when a relay requesting station wishes to send an image information to be relayed to a destination station it calls for the relay station to establish a transmission circuit. Upon the calling, the network control circuit 1f is actuated.

Then the telephone number of the sending station and the information concerning the destination station is sent by the sending station according to the predetermined procedures prior to the image information sending. The information sent thereafter is supplied through the external memory interface 1k and the facsimile interface 2a of the memory device 2 to the CPU 2e.

The CPU 2e searches (step 11) the sending station table TS and stores a relay requesting data on the relay demand check information area of the table TS, the telephone number data of the sending station in the sending station telephone number information area thereof and a time data in the sending time information area thereof. And, at the same time, the CPU 2e resets the call number counter (step 12).

Then, the CPU 2e searches the file table TF (step 13) and stores the transmission demand data in the transmission demand check information area of the file table TF, a 4-digit serial number data in the file name area thereof and an address of the sending station table TS searched by the step 11 in the sending station table address area thereof (step 14).

After inputting the destination station information (step 15), the CPU 2e searches the destination table TC a corresponding number of times to the number of the destination stations (step 16) and stores the data representing the sending demand in the check information area of the destination table TC of the destination station, the telephone number thereof in the receiving station telephone number information area thereof, the transmission time assigned in the transmission time information area thereof and address of the file tables TT in the file table address area and simultaneously resets the page counter and the call number counter (step 17).

Thereafter, the CPU 2e searches the mode table TM 1 corresonding to a first page of the image information (step 18) and stores the address of the mode table TM 1 in the initial portion of the mode table address area of the file table TF (step 19).

Then, the facsimile device 1 is brought into operation. When a mode information (e.g. line density and sheet size etc.) concerning the first page from the relay station is sent, the CPU 2e stores a data representing an effectiveness in the effectiveness display information area of the mode table TM 1, the line density data in the line density information area thereof and the sheet size data in the sheet information area thereof (step 20).

Then, the CPU 2e searches an empty area of the image memory 2c and stores an address of an initial portion of the area in the image memory start address area (step 22).

Then, the relay requesting station sends the first page.

The image information of the fist page is demodulated by the MODEM 1e and then converted into the original image signal by the code compression/expansion circuit 1d, the latter signal being supplied through the buffer 1c, the external memory inferface 1k and the facsimile interface 2a to the code compression/expansion circuit 2b for a coding thereof according to a suitable system for a storage thereof in the image memory 2c. The coded information is stored in the memory 2c (step 22).

When a signal representing an existence of a subsequent page is sent by the sending station, the step 23 provides an affirmative decision. Upon this decision, the CPU searches another mode table TM (step 24) and stores an address of the searched mode table TM in the subsequent table address area (step 25). Then, the operation is returned to the step 20.

The steps 20 to 25 are repeated until all of the image information are sent by the relay requesting station.

For generating a signal representing a completion of transmission from the relay requesting station, the step provides a negative decision upon which the CPU stores data FFH representing a completion of operaton in the subsequent mode table address area of the mode table TM corresponding to the lost page (step 26) and data representing the number of all pages in the original sheet number information area of the file table TF.

In this manner, the image information and the destination station information from the sending station, i.e., the relay requesting station are stored.

Figure 4:
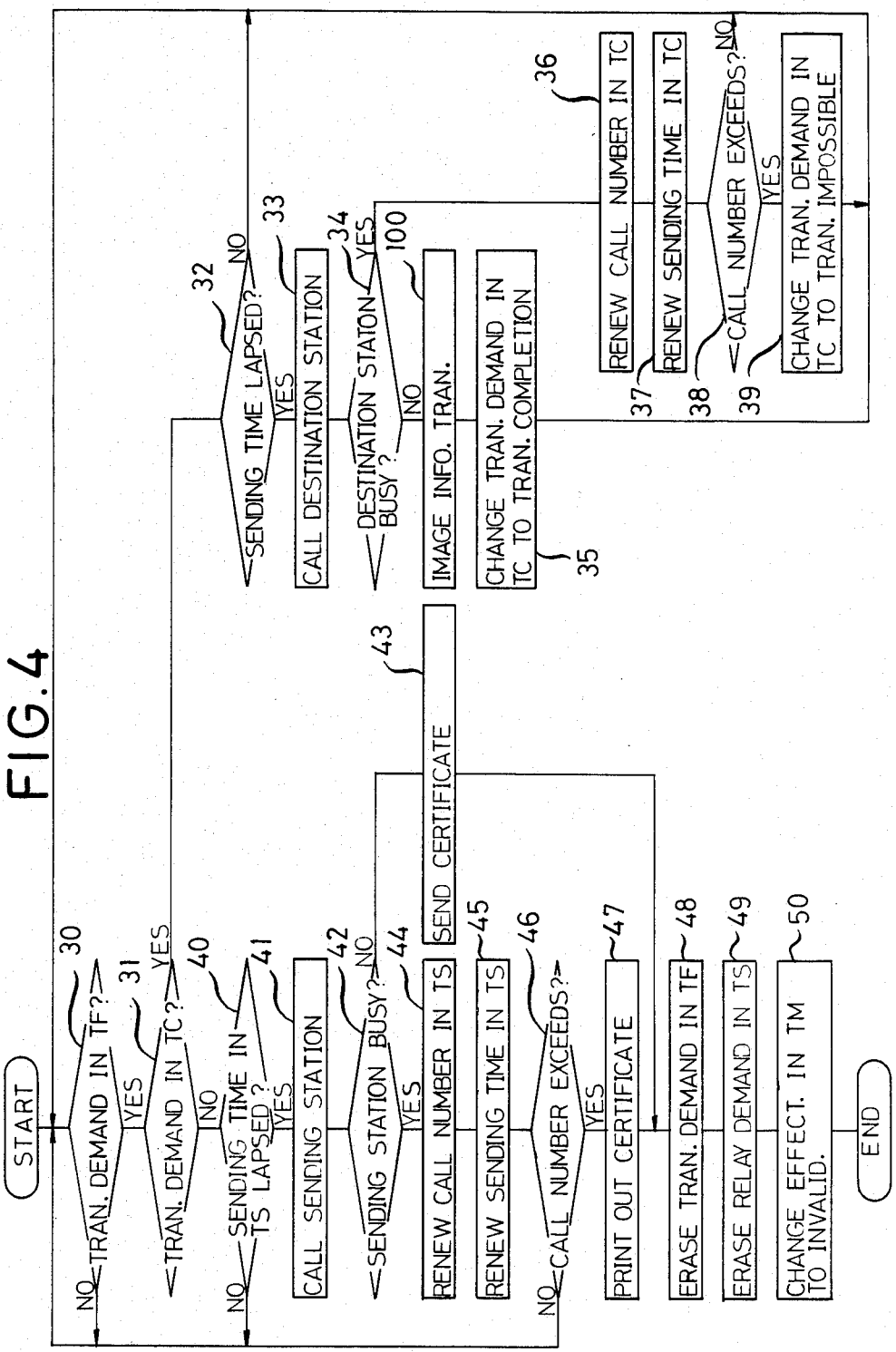
FIG. 4 is a flow chart of transmissions of the image information and the relay certificate.

Then, the transmission of the stored information is started according to the procedure shown in FIG. 4.

Firstly, it is decided in a step 30 whether or not a transmission demand data is stored in the the transmission demand check information area of the file table TF. When the decision is affirmative, the CPU searches a destination table TC which has the file table address area in which the address of the file table TF is stored and it is decided in a step 31 whether or not a transmission demand data is stored in the transmission demand check information area of the destination table TC.

When the decision in the step 31 is affirmative, contents of the receiving station telephone number information area of the destination tables TC whose transmission times are passed over (according to an affirmative decision in a step 32) are transmitted to the network control circuit 1f to call for the destination stations (step 33).

When the destination stations are not busy and a decision step 34 provides a negative decision, an image information transmission procedure 100 is performed to transmit the image information to the destination stations.

Figure 5:
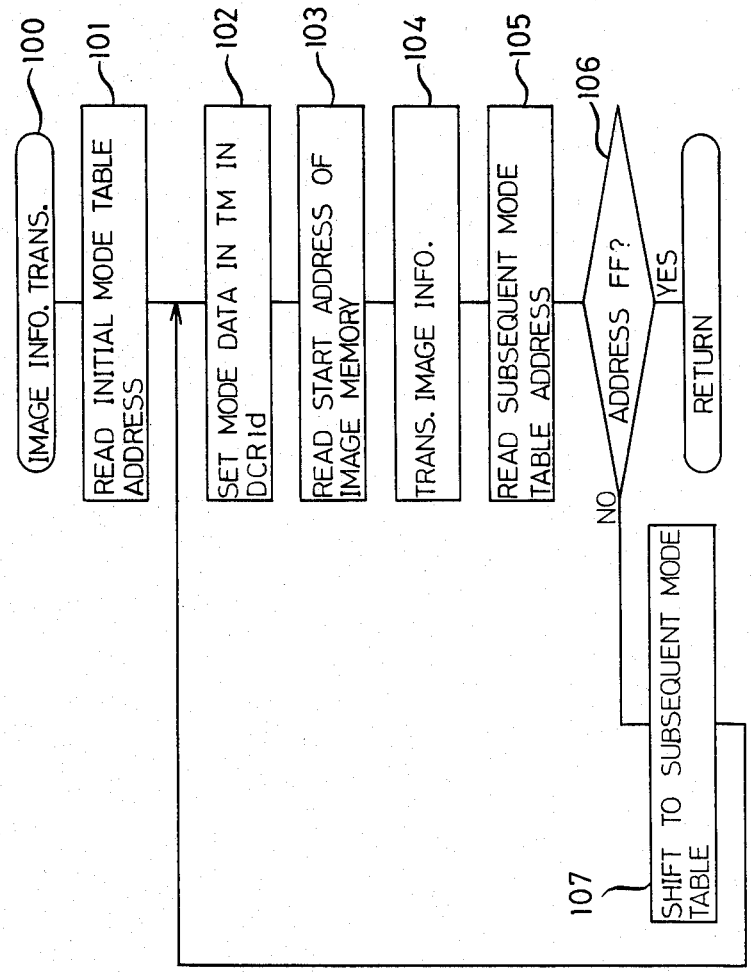
FIG. 5 is a flow chart of an image information transmission processing performed by the embodiment in FIG. 1.

An example of the procedure 100 is shown in FIG. 5.

In FIG. 5, the CPU verifies the file table address of the destination tables TC corresponding to the destination stations called for, to search file tables TF and reads out addresses of the first page mode table TM from the initial mode table address area of the file table TF (step 101).

Then, the line density data and the sheet data in the mode table TM is transferred to the code compression-/expansion circuit 1d to set an image processing mode (step 102), and the CPU reads out the image memory start address portion to read the image information from the image memory 2c (step 103).

Then, the data for all pages are readout from the image memory 2c and sent to the code compression/expansion circuit 2b to restore the image signals, sequentially, which are supplied through the facsimile interface 2k and the buffer 1e to the code compression/expansion circuit 1d to code them according to the predetermined system and the coded signal is subjected to a predetermined data modulation by the MODEM 1e and sent through the network control circuit 1f to the transmission line (step 104).

The CPU reads the subsequent mode table address of the mode table TM at a time when the image information of one page completes (step 105) and determines whether or not it is the last page equal to FFH (step 106).

When the decision in the step 106 is negative, a mode table TM assigned by the subsequent table address is searched (step 107) and the operation is returned to the step 102, this processing being repeated.

Since the decision in the step 106 becomes affirmative when the image information transmitted page by page is completed, the transmission operation to the destination stations is completed and returned to the original routine, and a data representing the transmission completion is stored in the transmission demand information area of the destination station table TC for the destination stations (step 35).

When the destination stations are busy and the decision in the step 34 is affirmative, the call number counter of the destination station table TC is renewed (step 36) and the transmission time information area is renewed to a time equal to that time added by, for example, 6 minutes (step 37).

When the count of the call number counter exceeds a predetermined value, e.g., 3, and the decision in the step 38 becomes affirmative, a data representing that a transmission is impossible is stored in the transmission demand check information area of the destination table TC (step 39).

When the decision in the step 31 becomes negative after the transmission of the image information to the destination station is completed (there may be cases where the transmission is impossible), the time data is read from the transmission time information area of the tranmsission station table TS to determine whether or not the transmission time lapses (step 40).

Since the transmission time at the first decision mode in the step 40 coincides with the requested time, the decision becomes affirmative. Then the transmission station telephone number information area of the transmission station table TS and the relay requesting station is called for (step 41).

When, at this time, the relay requesting station is not busy and the decision in a step 42 is negative, the relay certificate transmission for notifying the relay requesting station a completion of relay operation which is represented by a correspondency between the content of the transmission demand check information area of the respective destination tables TC, i.e., the transmission data or transmission impossiblity data, and the respective receiving station telephone numbers is performed (step 43).

When the relay requesting station is busy and the decision in the step 42 is affirmative, the content of the call number counter of the transmission station table TS is renewed (step 44) and the transmission time information area at that time is renewed by a time added by a predetermined time, for example, 6 minutes thereto (step 45).

At this time, when the content of the call number counter exceeds a predetermined value, e.g., 3, and the decision in a step 46 becomes affirmative, the relay certificate is printed out by the printer 1b (step 47).

After printing, data representing an absence of the transmission demand is stored in the transmission demand check information area of the file table TF (step 48), data representing an absence of the relay demand is stored in the relay demand check area of the transmission station table TS (step 49), and data representing an invalidity condition is stored in the effectiveness display information area of the respective mode tables TM (step 50).

The relay certificate is composed of a predetermined message followed by a series of letters representing a completion of the relay operation. In order to handle the relay certificate in the same manner as that for the image signal in transmission, these letters are converted into a dot information by a character generator which is formed in, for example, the ROM 2f and the dot information is stored in a line buffer which is formed in, for example, the RAM 2g, for a subsequent use.

In doing so, it may be effective to make the content of the message to be sent to the relay requesting station different from the content of the message to be sent to the printer 1b.

The message to be sent to the printer 1b may be composed of the relay certificate and an additional message, an example of which is given below.

"To facsimile operator; Please send the following relay certificate to the relay requesting station. 'Telephone number of the relay requesting station'".

With such additional message, it is possible to instruct the facsimile operator to mail the relay certificate to the relay requesting station.

Although it is performed by the CPU 1h of the facsimile device 1 and the CPU 2e of the memory device 2, the processing has been described such that it can be performed by a single CPU, because the latter CPUs cooperate each other by exchanging control information therebetween.

Alternatively, it may be possible to consitute a facsimile relay device having a facsimile device 1 equipped with the function of the memory device 2.

Further, it may be possible to add to the CPU 2e a function of detecting a power supply failure and, immediately after the failure is removed, revising the content of the transmission demand check information area of the destination station table TC which is in a condition representing an existence of the transmission demand to data representing a transmission impossibility. With the latter construction, the decision in the step 31 becomes negative immediately, so that the transmission of the relay certificate can be performed.

Therefore, even if the image information stored in the image memory is erased by the power supply failure, it is possible to send the relay certificate to the relay requesting station.

As described hereinbefore, according to the present invention, it is possible to always keep the relay certificate and to send it to the relay requesting station reliably.

What is claimed is:

1. In a facsimile relay device having a printer, an external interface, means for temporarily storing image information provided from a sending station, and means for relaying stored image information to a destination station appointed by a sending station, the improvement comprising:

an auxiliary memory device operatively connected to said external interface of said facsimile relay device, means for determining when a relay operation from a sending station has been completed, means for sending a relay certificate from a destination station to a sending station indicative of completion of a relay operation to the destination station, means cooperating with said relay certificate sending means for repeating the relay certificate sending operation a predetermined number of times if the relay certificate sending operation is unsuccessful, and control means for actuating said printer to print out a relay certificate at the destination station if said relay certificate sending operation is not successful after said predetermined number of times, whereby a printed relay certificate record is provided at the destination station if the relay certificate sending operation to the sending station is unsuccesful, such that said record can be manually sent at a later time to the sending station.

2. A facsimile relay device according to claim 1, wherein said auxiliary memory device has a back-up power source to allow completion of said relay certificate sending operation even if a main power source for the facsimile relay device fails.

3. A facsimile relay device according to claim 1, wherein said control means operates to print said relay certificate at the destination station if said relay certificate sending operation is unsuccessful within a predetermined time period.

4. A facsimile relay device according to claim 1, wherein said auxiliary memory device includes an image memory, a RAM for controlling said image memory, and said control means including a CPU for controlling said relay certificate sending operation and printing operation.

* * * * *